(12) United States Patent
Dohle et al.

(10) Patent No.: US 10,385,938 B2
(45) Date of Patent: Aug. 20, 2019

(54) BRAKE SHOE HAVING A WEAR INDICATOR

(71) Applicant: TMD Friction Services GmbH, Leverkusen (DE)

(72) Inventors: Achim Dohle, Leverkusen (DE); Bernd Rohrberg, Essen (DE); Werner Rothmann, Essen (DE)

(73) Assignee: TMD Friction Services GmbH, Leverkusen (DE)

( * ) Notice: Subject to any disclaimer, the term of this patent is extended or adjusted under 35 U.S.C. 154(b) by 0 days.

(21) Appl. No.: 15/127,863

(22) PCT Filed: Sep. 1, 2015

(86) PCT No.: PCT/EP2015/069901
§ 371 (c)(1),
(2) Date: Sep. 21, 2016

(87) PCT Pub. No.: WO2016/037889
PCT Pub. Date: Mar. 17, 2016

(65) Prior Publication Data
US 2017/0184169 A1    Jun. 29, 2017

(30) Foreign Application Priority Data

Sep. 8, 2014 (DE) .................. 10 2014 112 868

(51) Int. Cl.
*F16D 66/02* (2006.01)
*F16D 69/02* (2006.01)
*F16D 69/04* (2006.01)

(52) U.S. Cl.
CPC ......... *F16D 66/027* (2013.01); *F16D 66/024* (2013.01); *F16D 66/026* (2013.01);
(Continued)

(58) Field of Classification Search
CPC .... F16D 66/024; F16D 66/026; F16D 66/027; F16D 66/02; F16D 66/021; F16D 66/022;
(Continued)

(56) References Cited

U.S. PATENT DOCUMENTS

| 8,468,881 B1 * | 6/2013 | Hower ................. G01B 21/14 73/121 |
| 2006/0042734 A1 * | 3/2006 | Turner ................. B60C 11/24 152/154.2 |

(Continued)

FOREIGN PATENT DOCUMENTS

| DE | 102006039590 A1 | 4/2008 |
| DE | 102013014534 B3 | 5/2014 |

(Continued)

OTHER PUBLICATIONS

Rothmann (EP 0754875 A1), English-language machine translation.*
Int'l Search Report dated Nov. 18, 2015 in Int'l Application No. PCT/EP2015/069901.

*Primary Examiner* — Bradley T King
*Assistant Examiner* — Stephen M Bowes
(74) *Attorney, Agent, or Firm* — Rogowski Law LLC

(57) ABSTRACT

The invention relates to a brake shoe (1) for disk or drum brakes, which comprises a supporting plate (2) with a friction pad (3) attached thereto and at least one wear indicator (4), characterized in that the wear indicator (4) has a wear sensor (6) for continuous or multi-stage measurement of the wear of the friction lining and a receiver and transmitter unit (5) for wireless signal transmission, the receiver and transmitter unit being a passive RFID (Radio Frequency Identification) or SAW (Sound Acoustic Wave) transponder.

14 Claims, 1 Drawing Sheet

(52) U.S. Cl.
CPC ......... *F16D 69/02* (2013.01); *F16D 69/0408* (2013.01); *B60Y 2410/111* (2013.01); *F16D 2069/0425* (2013.01)

(58) Field of Classification Search
CPC ..... F16D 66/023; F16D 66/028; B60C 11/24; B60C 11/243; B60C 11/246
See application file for complete search history.

(56) References Cited

U.S. PATENT DOCUMENTS

| | | | |
|---|---|---|---|
| 2007/0252719 A1 | 11/2007 | Ray | |
| 2008/0190712 A1* | 8/2008 | Hagberg | F16D 65/092 188/1.11 L |
| 2010/0030490 A1 | 2/2010 | Wright | |
| 2010/0253497 A1* | 10/2010 | Bakker | F16D 66/026 340/454 |
| 2010/0283595 A1* | 11/2010 | Korecki | F16D 66/022 340/454 |
| 2010/0319446 A1 | 12/2010 | Coue | |
| 2011/0012724 A1* | 1/2011 | Elstorpff | F16D 66/02 340/454 |
| 2011/0133923 A1* | 6/2011 | Evans | B60T 17/221 340/454 |
| 2012/0006633 A1* | 1/2012 | Pahle | F16D 66/00 188/72.1 |
| 2015/0034222 A1* | 2/2015 | Martin | B60C 11/243 152/154.2 |

FOREIGN PATENT DOCUMENTS

| | | |
|---|---|---|
| EP | 0754875 A1 | 1/1997 |
| JP | 2008-535714 A | 9/2008 |
| JP | 2010-032054 A | 2/2010 |
| JP | 2010-506787 A | 3/2010 |
| JP | 2011-501051 A | 1/2011 |
| WO | 2006098714 A1 | 9/2006 |
| WO | 2008046766 A1 | 4/2008 |
| WO | 2009050001 A1 | 4/2009 |

* cited by examiner

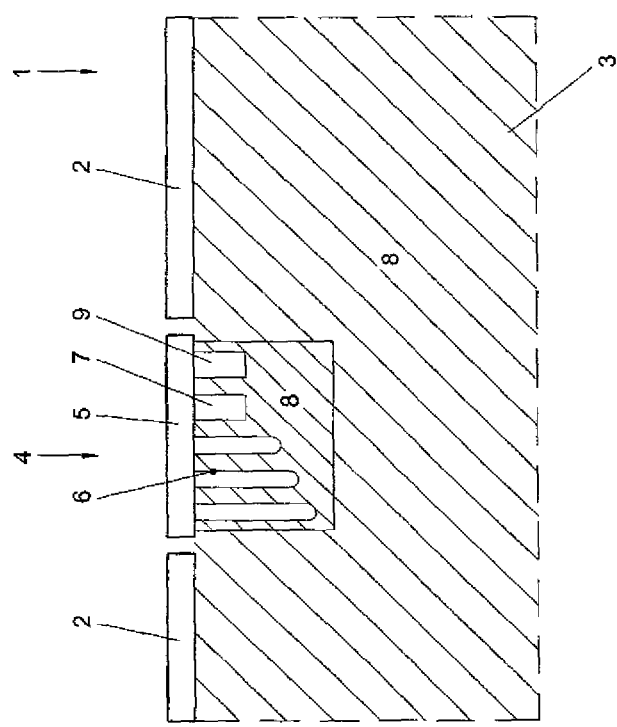

BRAKE SHOE HAVING A WEAR INDICATOR

CROSS-REFERENCE TO RELATED APPLICATIONS

This application is a national stage application (under 35 U.S.C § 371) of PCT/EP2015/069900, filed Sep. 1, 2015, which claims benefit of German application No. 10 2014 112 868.0, filed Sep. 8, 2014, the contents of each of which are incorporated by reference herein.

BACKGROUND OF THE INVENTION

Technical Field and State of the Art

The invention relates to a brake shoe for a brake system having a means installed in the area of the friction lining, among other things, for purposes of detecting the state of wear of the friction lining. The brake shoe lends itself for disc brakes and drum brakes, preferably for disc brakes, and it can be used in all types of vehicles, especially in passenger cars and utility vehicles. Moreover, the invention relates to the production of such a brake shoe.

European patent EP 0 754 875 B1 already discloses a brake shoe with a wear indicator that has several conductor loops and that is electrically connected to a control or display device via connector plugs and cables. The control device detects whether the electric circuit is interrupted or else closed, that is to say, whether the conductor loops are no longer conducting or are conducting. The signal thus generated serves to ascertain the state of wear of the friction lining. The production and installation of such a brake shoe are impaired by the necessary plug connectors and cable connections, which can also have a detrimental effect on the sturdiness of the system during daily operation.

German patent application DE 10 2008 032 818 A1 cites the above-mentioned European patent as the state of the art and describes a brake shoe in which there is a sensor that is configured in the form of a passive transponder on the lining carrier plate and that is connected via a coil circuit to a wear pellet in the actual friction lining. This wear pellet can show the state of wear of the friction lining in discrete increments. If the transponder is embedded directly in the friction lining, it is destroyed once a predefined friction lining thickness has been reached. Different friction lining thicknesses are displayed by incorporating several transponders at various depths of the friction lining. Due to the cited complexity, the production of such brake shoes or of such wear-detection systems continues to be laborious and thus cost-intensive.

Other documents of the state of the art, which, like the above-mentioned German document, describe the use of passive transponders or the use of so-called RFID technology to detect wear or to monitor the thickness of friction linings are described, for example, in German patent applications DE 10 2008 011 288 A1 and DE 10 2008 020 425 A1.

Before this backdrop, it was an objective of the present invention to put forward a brake shoe that is equipped with a system which allows the state of wear of a friction lining to be monitored as continuously as possible, while largely avoiding the drawbacks of the state of the art. Moreover, such an arrangement is intended to be sturdy and reliable in everyday operation and it should also be as simple and thus as cost-effective as possible to produce.

SUMMARY OF THE INVENTION

According to an embodiment of the invention, a wear indicator is provided which is arranged on the actual friction lining and which, in its preferred form, is embedded in the friction lining. This wear indicator comprises at least two elements. The first one is the actual sensor that detects the state of wear of the friction lining and that is configured to detect the state of wear continuously, or at least in small increments. This sensor preferably consists of conductor loops, a so-called resistance network, which extends to different depths in the wear indicator and thus likewise to different depths in the friction lining. As the wear of the friction lining progresses, the conductor tracks are gradually interrupted and an appertaining signal generated by the receiver-transmitter unit located in the wear indicator is received and displayed by a control unit and/or reading device that is installed in the vehicle or located externally. Preferably, this sensor has one to ten conductor loops that are preferably made of metallic materials such as, for instance, copper or aluminum, or else they are electrically conductive plastics known to the person skilled in the art such as, for example, doped polyacetylene.

The receiver-transmitter unit, as the second element, is preferably a transponder and, in the preferred embodiment, it is a passive transponder. This transponder allows signal transmission and signal processing employing wireless transmission technology. The transmission technology preferred according to the invention is the so-called RFID (radio frequency identification) technology and especially also SAW (surface acoustic wave) technology.

As a rule, the transponder or tag of an RFID system consists of a microchip, an antenna, a carrier or housing and a source of power which, in case of passive transponders, is in the form of, for example, a capacitor. In the case of passive transponders, the power they need to supply the microchip is drawn from the electromagnetic waves received from the reading device. Once the permissible amount of wear of the friction lining has been reached, which is determined by the relative position of the above-mentioned actual wear sensor in the friction lining and which is dependent on the application purpose, on the load and on the relevant safety requirements in a concrete case, the friction member comes into contact with the transponder or the sensor, thereby changing its function. The signal fed back from the transponder is different from the signal when the wear sensor is in the intact state and this signal is then received and displayed by the control unit and/or reading device. In this context, the progressive wear (successive interruption of the conductor tracks) corresponds to a signal pattern that is stored on the microchip and that is fed back to the control unit and/or reading device. Preferably, a non-erasable identification code that has been specified for each type of brake shoe is stored on the RFID microchip. In this manner, for instance, the state of wear of the friction linings of the various vehicles of a given company (for example, a shipping company) can be centrally stored, monitored, and the replacement of the lining can be scheduled, thus ensuring an optimal utilization period and minimal downtimes of the vehicles.

Instead of an RFID transponder or RFID tag, according to the invention, in a preferred embodiment, it is also possible to use so-called SAW tags that utilize the SAW effect. With SAW tags, microwaves received via an antenna are ultimately converted into surface acoustic wave (SAW). Reflected SAWs are converted back into electromagnetic waves which, in turn, are then transmitted via the antenna of the tag to the control unit or reading device. The main advantages of SAW tags in comparison to normal RFID systems are their excellent temperature resistance (e.g. up to 350° C.), the large reading distance as compared to inductive RFID systems and their high mechanical strength and chemical resistance.

RFID tags and SAW tags (transponders) as well as the associated control units and reading devices that can be used for the invention are commercially available.

In another preferred embodiment, the wear indicator according to the invention also has a temperature sensor that works continuously or discontinuously. This element preferably operates in accordance with one of the following measuring principles:

- thermal resistance effect (metal-based temperature probes, for example, platinum or copper resistance sensors)
- mechanical effects (for instance, expansion sensors or gas-pressure sensors)
- thermoelectric effects (for example, sheathed thermocouples, e.g. NiCr Ni)
- radiation effect (for instance, pyrometers)
- temperature-indicating paints
- liquid crystals
- thermal noise thermometers, luminescence thermometers with fiber optics
- Seger cones
- quartz thermometers
- acoustic measuring methods.

In this context, the temperature sensor can either penetrate the entire friction lining, coming into direct contact with the brake disc, or else it can end inside the friction material of an interlayer that might be present, or inside a carrier plate. If there is direct contact with the brake disc, the temperature sensor or the thermocouple or the thermoelectric wires wear out together with the friction material without losing their sensor properties in this process. By the same token, it can be provided that the thermocouple is destroyed beyond a certain wear limit and this destruction serves to indicate that the friction lining has reached the end of its service life.

Preferably, this sensor element is incorporated into the described sheath. This can be here, for instance, a standard NiCr Ni thermocouple type K, commercially available, for example, from the Therma company (http://www.thermagmbh.de). By the same token, thermocouples can be made from individual thermoelectric conductors with a silica insulation and ceramic sleeves (such as, for example, Omegatit450®) and then integrated.

In another preferred embodiment, the wear indicator according to the invention additionally has a so-called maximum-temperature storage element. This element consists of fusible, electrically conductive materials having a defined melting temperature. The melting temperature here corresponds to a maximum temperature that should not be exceeded during use of the friction lining. When the temperature is exceeded, the melt causes a short circuit or else a contact is established, and a signal to this effect is transmitted to the control unit or reading device and thus to the driver of the vehicle. This mode of operation fundamentally corresponds (except for the melt) to that also found with the actual wear sensor above. A suitable, fusible and electrically conductive material for the maximum-temperature storage element is, for instance, zinc, which has a melting temperature of 420° C.

Preferably, the maximum-temperature storage element has two or more of the above-mentioned fusible units, which are arranged without being in contact with each other.

The cited components and other components (not cited here) of the wear indicator according to the invention fundamentally can be freely combined, depending on their type and number.

The wear indicator or sheath according to the invention preferably has a cylindrical or conical shape and is preferably installed in the area of the carrier plate, in a through-opening or depression in the carrier plate or on the carrier plate. Its diameter is typically within the range from 10 mm to 30 mm and, at the maximum, its height is the same as the thickness of the friction lining that has been applied onto the carrier plate, or, at the maximum, the same as the thickness of the friction lining plus the thickness of the carrier plate (sheath installed in the through-opening of the carrier plate) or else plus the depth of the depression in the carrier plate. As a rule, the sheath will not extend all the way to the surface of the friction lining, but rather, only as far as a predefined wear limit, which depends on the type and use of the friction lining.

Preferably, it can be provided for the wear indicator or sheath to be made of a heat-resistant thermoset material having the same properties as the friction material, or else it is made of the actual friction material. Towards this end, according to the invention, it is preferable to use a friction mixture provided for the envisaged application purposes or else to use at least typical constituents of such a mixture such as, for instance, phenol resins and/or epoxy resins and/or non-conductive fillers. The described elements (wear sensor, transponder and maximum-temperature storage element) are then embedded into this material, that is to say, the space between these elements is filled up with this material and these elements are surrounded by this material, which thus also forms the outer layer of the sheath.

The production of the brake shoe according to the invention and thus also the preferred arrangement of the wear indicator fundamentally correspond to the method and the arrangement as described in European patent EP 0 754 875 B1, For purposes of the description being presented here, express reference is hereby made to the appertaining disclosure in said document, especially to the elaborations in paragraphs [0013] to [0022].

A brake shoe according to the invention is preferably produced in such a way that a through-opening or depression is made in the carrier plate and the ready-to-use wear indicator is inserted on the friction lining side into this through-opening or depression before the friction material is pressed on. Subsequently, the friction material (with or without an interlayer and with or without an additional adhesive layer) is pressed onto the carrier plate (the lining carrier).

The advantages thus achieved especially refer to the fact that, since the friction material is pressed onto the lining carrier after the wear indicator has previously been installed, the wear indicator is permanently incorporated into the friction material and its position in the friction lining can no longer change.

The recesses in the friction lining that serve to accommodate the wear indicator or, as is provided according to the invention, that serve to accommodate two or more wear indicators, are reduced in such a way that the friction surface is maximally utilized. Owing to the complete encapsulation of the sheath with and in the friction material, said sheath is protected against damage during the installation and use of the brake shoe.

Thanks to the presented approach, it is possible to dispense with the work that is otherwise necessary in order to retrofit the wear indicator, which involves holes being drilled and dirt then having to be removed. The through-opening that might be necessary in the carrier plate is created in the same stamping process with which, for example, the requisite anchoring recesses are created.

The embodiments and features of the present invention cited in the preceding description and in the embodiment that follow are not to be construed as a limitation thereof. Rather, the invention encompasses any feature combination the person skilled in the art might consider to be advantageous.

DESCRIPTION OF THE DRAWING

An embodiment of the invention is explained in detail below making reference to the drawing.

FIG. 1 shows a cross-sectional view of the brake shoe according to the invention as well as the wear indicator or the sheath according to the invention.

DETAILED DESCRIPTION

The brake shoe 1 shown in FIG. 1 consists of a carrier plate or lining carrier 2, with a friction lining 3 which is applied onto the lining carrier plate 2, and with a wear indicator 4 which is embedded into the friction lining 3. This wear indicator 4 is installed in a through-opening in the carrier plate 2 and it has a wireless receiver-transmitter unit 5 (RFID tag or SAW tag), a wear sensor 6 that works continuously or in increments (as shown here in the form of conductor loops) and a maximum-temperature storage element 7 as well as a temperature sensor 9. The filler and the material 8 that surrounds these elements 5-7 and 9 and that forms the outer shell of the wear indicator 4 is made of the same friction material as the friction lining 3 itself.

The invention claimed is:

1. A brake shoe (1) for disc brakes or drum brakes, comprising:
    a carrier plate (2) having a friction lining side and an opposite side, said carrier plate defining a through-opening or depression on the friction lining side;
    at least one wear indicator (4) formed as a separate element insertable into the through-opening or depression on the friction lining side of the carrier plate, said wear indicator (4) comprising (i) a wear sensor (6) to measure the wear of the friction lining continuously or in increments, (ii) a receiver-transmitter unit (5) for wireless signal transmission, said wear indicator configured as a sheath that embeds the wear sensor in friction material (8), and having the receiver transmitter unit (5) joined to the wear sensor (6) and in contact with the friction material forming the sheath; and
    a friction lining (3) pressed onto the friction lining side of the carrier plate (2) and embedding said sheath of said wear indicator (4) therein, wherein the friction material (8) of the sheath into which the wear sensor (6) is embedded is a same material composition as the friction lining (3).

2. The brake shoe (1) according to claim 1, wherein the receiver-transmitter unit (5) is an RFID (radio frequency identification) transponder or a SAW (sound acoustic wave) transponder.

3. The brake shoe (1) according to claim 1, wherein the receiver-transmitter unit (5) is an RFID (radio frequency identification) transponder that is passive.

4. The brake shoe (1) according to claim 1, wherein the receiver-transmitter unit (5) is a SAW (sound acoustic wave) transponder.

5. The brake shoe (1) according to claim 1, further comprising several conductor loops in the wear sensor (6).

6. The brake shoe (1) according to claim 1, further comprising a temperature sensor (9) embedded within the sheath of the wear indicator (4).

7. The brake shoe (1) according to claim 1, further comprising a maximum-temperature storage element (7) embedded within the sheath of the wear indicator (4).

8. The brake shoe (1) according to claim 1, wherein the wear indicator (4) has a cylindrical or conical shape.

9. The brake shoe (1) according to claim 1, wherein the wear indicator (4) has a maximum diameter ranging from 10 mm to 30 mm.

10. The brake shoe (1) according to claim 1, wherein the wear indicator (4) is insertable into the through-opening in the carrier plate (2) and into a blind bore formed in the friction lining (3).

11. A method for making a brake shoe (1), comprising the following steps:
    a) making a through-opening in a carrier plate (2), said carrier plate having a friction lining side adapted to receive a friction lining (3) and an opposite side;
    b) inserting a wear indicator (4) into the through-opening of the carrier plate (2), said wear indicator comprising (i) a wear sensor (6) to measure the wear of the friction lining (3) continuously or in increments and (ii) a receiver-transmitter unit (5) for wireless signal transmission joined to the wear sensor (6), said wear indicator (4) configured as a sheath of friction material (8) that is separate from the friction lining (3) and into which the wear sensor (6) is embedded, and with which friction material (8) the receiver transmitter unit (5) is in contact, and wherein the friction material (8) of the sheath into which the wear sensor (6) is embedded is a same material composition as the friction lining (3); and
    c) pressing the friction lining (3) onto the friction lining side of the carrier plate (2) to embed the sheath of the wear indicator (4) in the friction lining (3).

12. The method of claim 11, wherein the wear indicator (4) further comprises (iii) a temperature sensor (9) embedded within the sheath of friction material (8).

13. The method of claim 12, wherein the wear indicator (4) further comprises (iv) a maximum-temperature storage element (7) embedded within the sheath of friction material (8).

14. A brake shoe for disc brakes or drum brakes, comprising:
    a carrier plate having a friction lining side and an opposite side, said carrier plate defining a through-opening or depression on the friction lining side;
    at least one wear indicator formed as a separate element insertable into the through-opening or depression on the friction lining side of the carrier plate, said wear indicator comprising (i) a wear sensor to measure the wear of the friction lining continuously or in increments, (ii) a temperature sensor, and (iii) a receiver-transmitter unit for wireless signal transmission, said wear indicator configured as a sheath that embeds the wear sensor and temperature sensor together in friction material, and having the receiver transmitter unit joined to the wear sensor and in contact with the friction material forming the sheath; and
    a friction lining pressed onto the friction lining side of the carrier plate and embedding said sheath of said wear indicator therein, wherein the friction material of the sheath into which the wear sensor and temperature sensor are embedded is a same material composition as the friction lining.

* * * * *